(12) United States Patent
Kastalsky et al.

(10) Patent No.: US 7,265,354 B2
(45) Date of Patent: Sep. 4, 2007

(54) SEMICONDUCTOR SCINTILLATION HIGH-ENERGY RADIATION DETECTOR

(76) Inventors: Alexander Kastalsky, 3 Kenneth Dr., Wayside, NJ (US) 07712; Serge Luryi, 16 Holly Ln., Old Field, NY (US) 11733; Boris Spivak, 2559 NE. 83rd St., Seattle, WA (US) 98115

( * ) Notice: Subject to any disclaimer, the term of this patent is extended or adjusted under 35 U.S.C. 154(b) by 243 days.

(21) Appl. No.: 11/144,443

(22) Filed: Jun. 6, 2005

(65) Prior Publication Data

US 2006/0273258 A1 Dec. 7, 2006

(51) Int. Cl.
*C09K 11/54* (2006.01)
*G01T 1/20* (2006.01)

(52) U.S. Cl. ............ 250/370.01; 250/370.12; 250/370.13; 250/370.14; 250/370.09; 250/370.11

(58) Field of Classification Search ........ 250/370.01, 250/370.11, 370.12, 370.13, 370.14
See application file for complete search history.

(56) References Cited

U.S. PATENT DOCUMENTS

| | | | | |
|---|---|---|---|---|
| 5,276,329 | A * | 1/1994 | Hughes | 250/370.11 |
| 6,140,669 | A * | 10/2000 | Lozykowski et al. | 257/103 |
| 6,674,098 | B1 * | 1/2004 | Niki et al. | 257/102 |
| 7,048,872 | B2 * | 5/2006 | Derenzo et al. | 252/301.6 R |
| 2007/0051892 | A1 * | 3/2007 | Warburton et al. | 250/362 |

OTHER PUBLICATIONS

Windisch et al., Light-Extraction Mechanisms in High-Efficiency Surface-Textured Light -Emitting Diodes, IEEE Journal on Selected Topics in Quantum Electronics, vol. 8, No. 2, Mar./Apr. 2002, p. 248.*
Schnitzer et al., 30% external quantum efficiency from surface textured, thin-film light- emitting diodes, Oct. 18, 1993, Appl. Phys. Lett. 63 (16), p. 2174.*

* cited by examiner

*Primary Examiner*—David Porta
*Assistant Examiner*—Djura Malevic

(57) ABSTRACT

A high-energy radiation detector is disclosed which uses a semiconductor material to absorb high-energy radiation and emit secondary light in response. The semiconductor is designed to be largely transparent for the interband light it emits so that the generated secondary photons can reach the semiconductor surface, to be detected by a suitable photo-detector. The semiconductor thus plays a role of a scintillator with the emitted light registered by a photo-detector.

Two different device embodiments are disclosed. The first embodiment employs a uniform bulk slab of the appropriately chosen semiconductor, such as n-doped InP. Its principal advantage lies in the simplicity and low cost. The second device employs a multi-layer heterostructure. The principal advantage of the second type detector is the possibility of a substantial enhancement in the efficiency of absorption of the primary high-energy radiation.

With appropriate modifications the disclosed detector can be used both for radiation monitoring, like a Gaiger counter, and for high-resolution analysis and characterization of the ionizing radiation.

21 Claims, 5 Drawing Sheets

Schematic diagram of the semiconductor radiation detector

Figure 1 (a). Room temperature absorption spectra of InP at different doping levels.

Figure 1 (b). Room temperature absorption and emission spectra of InP.

Figure 2. Schematic diagram of the semiconductor radiation detector

Figure 3. Schematic diagram of the semiconductor radiation detector with the photo-detector directly attached to the active zone Figure 4. Energy band diagram of the semiconductor material in the active interaction zone of the first type detector.

Figure 5. Energy band diagram of the semiconductor material in the active interaction zone of the second type detector.

SEMICONDUCTOR SCINTILLATION HIGH-ENERGY RADIATION DETECTOR

FIELD OF INVENTION

The invention relates to solid-state high energy radiation detectors, and more specifically, to a scintillating detector made from bulk semiconductor or semiconductor heterostructure.

BACKGROUND INFORMATION

There are two large groups of solid-state radiation detectors, which dominate the area of ionizing radiation measurements, namely, scintillation detectors and semiconductor diodes, see G. F. Knoll, Radiation detection and measurement, John Wiley & Sons, 2000.

The scintillators register the event of interaction with a penetrating high energy radiation through the generation of light which is subsequently detected by a photo-detector, typically a photo-multiplier, which converts light into an electrical signal.

Another group of solid-state detectors is based on semiconductors and employs reverse biased diodes, typically, p-n junctions, wherein the absorbed radiation creates in the depleted region of the junction a current of electrons and holes thereby producing an electrical response signal. The sensitivity of such detectors depends on forming a large active volume for interaction with the radiation, which is determined by the depleted region of the p-n junction. To increase said active volume, the doping level in the depleted region of the p-n junction sides must be minimized, since the depletion length is proportional to $1/(N)^{1/2}$, where N is the majority carrier density (electrons in n-type or holes in p-type).

Both groups of detectors have their drawbacks, resulting in a lower than desired signal response and resolution. The diodes typically suffer from inadequate electron-hole collection, i.e. not every electron-hole pair created by the radiation results in a current flow in the measurement circuit. In the case of scintillators, the efficiency of converting the high-energy radiation into light typically does not exceed 12%. In addition, the recombination time that is involved in light emission is several hundreds of nanoseconds (e.g., 230 ns for NaI), which is undesirably long for fast timing or high counting rate applications. Finally, all commercially available scintillators have a high energy gap, and therefore a relatively high energy (of 25 eV for NaI) is required per each electron-hole pair created by the primary ionizing radiation, which reduces the detector resolution.

The most common semiconductor materials used for the radiation detectors are Si and Ge, where the intrinsic carrier concentration can be reduced to a very low level, while the excellent material properties provide for good electric field uniformity. However, the relatively low atomic number Z of these materials, especially for Si (where Z=14), adversely affects their application to radiation detection, since the probability of interaction is proportional to $Z^{4.5}$. In order to obtain an acceptable p-n junction depletion length of approximately 1 to 1.5 cm, an additional procedure of Li doping is commonly applied to neutralize acceptors in the depletion region. The Li-doped detectors, however, need low temperatures, both during the operation and in storage. In addition, both Si and Ge radiation detectors require relatively high voltages, typically of order kilovolts, to maximize the collection of electrons and holes and increase their drift velocity. This results in an additional unwelcome noise in the current response, as well as leads to problems of surface conductance and voltage breakdown. Even at these high voltages, the response time is larger than 100 ns, because of the saturation of the electron and hole drift velocity at high fields. Finally, the dependence of the shape of the output pulse rise on the position at which the electron-hole pairs are created, significantly complicate the measurements.

Both above discussed groups of detectors are so different in their physical mechanisms of signal registration that they never overlap with respect to the materials used.

SUMMARY OF THE INVENTION

The radiation detector, according to the present invention, offers a new approach which utilizes semiconductor materials as scintillators. In the inventive design, the absorption of high energy radiation occurs in the semiconductor. The generated electrons and holes recombine inside the semiconductor volume producing photons with energy equal to the energy gap of the semiconductor, below referred to as secondary photoemission. The semiconductor is designed to be largely transparent for the wavelength of said secondary photoemission so that the generated photons can reach the semiconductor surface, where they are registered by a suitable photo-detector.

To optimize the internal light emission efficiency, the following material requirements must be fulfilled:
1. The material must be chosen in such a way that the radiative component of recombination dominates over non-radiative components.
2. The material structure must minimize the self-absorption of secondary light.
3. The material structure should be appropriately doped, so as to make radiative recombination the dominant recombination process.

This list of requirements leads to the well-known direct-gap III-V semiconductors. Among them, InP is expected to be the best candidate for several reasons:
a. The material is direct, and can provide high internal emission efficiency with the predominantly radiative component of recombination;
b. Indium has a relatively high atomic number Z=49 (vs. 14 for Si and 32 for Ge), while InP has a relatively low energy of ~4 eV per electron-hole pair created by the primary ionizing radiation;
c. Ternary materials, such as InGaAs, lattice matched to InP, allow formation of multi-layer heterostructures with different energy gaps and variable doping.
d. The InP/InGaAs heterostructures can be grown with several growth techniques, including MBE, MOCVD an HVPE. The latter technique is suitable for growth of thick structures.

Two preferred embodiments of the invention are disclosed. The first embodiment employs a relatively uniform bulk slab of the appropriately chosen semiconductor, exemplarily n-doped InP, as the active zone of interaction that is the volume where primary ionizing radiation is absorbed and secondary photoemission produced. Below, it will be referred to as the first type detector. Its principal advantage lies in the simplicity and low cost. The second embodiment employs as the active zone of interaction a multilayer heterostructure. The key to the heterostructure design is a combination of layers like undoped InP where absorption of ionizing radiation occurs and where electrons and holes are generated, with narrow gap layers, exemplarily n-dope InGaAs, where said electrons and holes recombine to produce secondary photoemission. This will be referred to as the second type detector. The principal advantage of the second type detector is the possibility of substantial enhancement in the volume of the active zone and therefore in the efficiency of absorption of the primary ionizing radiation.

The first type detector comprises a slab of semiconductor appropriately chosen in accordance with the above listed requirements. To maximize the radiation component of carrier recombination, the chosen material is a direct-gap semiconductor. To minimize the effect of self-absorption the semiconductor is made heavily doped. Heavy doping reduces the effect of self-absorption due to well known Moss-Burstein shift: in heavily doped semiconductors, the edge of absorption is blue-shifted by the Fermi energy of free carriers, see, e.g., K. Seeger, Semiconductor physics, Springer-Verlag. Doping with donors is preferable, because electrons typically have a lower effective mass than holes, producing a higher Fermi energy and larger Moss-Burstein shift for the same level of doping. For the purposes of present invention the most important aspect of Moss-Burstein shift is that it shifts the absorption spectra while not affecting in first approximation the semiconductor emission spectra.

Figure 1:
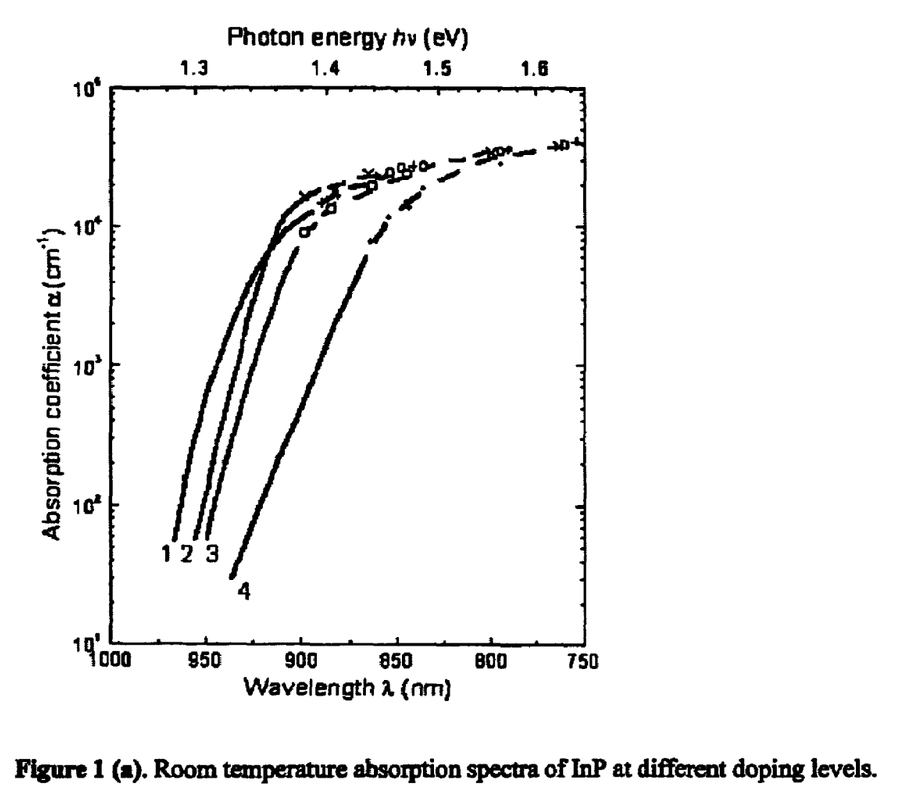
FIG. 1. Room temperature absorption and emission spectra of InP.

FIG. 1 shows the well-known typical spectral dependence of the absorption and emission coefficient in InP with different doping levels. The highest donor concentration presented in FIG. 1a is $3.7 \cdot 10^{18}$ cm$^{-3}$. Extrapolation to the preferred doping density of approximately $10^{19}$ cm$^{-3}$ yields an expected absorption coefficient in the range of 25-30 cm$^{-1}$ for photon energies typically emitted in the process of radiative recombination by electrons and holes in InP. The emitted spectrum is shown in FIG. 1b for lightly doped or undoped semiconductor. In a heavily doped semiconductor the emission spectrum shifts to lower energies due to the well known band narrowing effect, unrelated to Moss Burstein shift which remains operative.

Besides providing the Moss-Burstein shift, thus making the semiconductor more transparent to secondary photons, the heavy doping shortens the radiative recombination time $\tau$ of minority carriers, according to $\tau \sim 1/N_d$, where $N_d$ is the donor concentration. The radiative recombination time is thus made substantially shorter than the non-radiative recombination time, which makes the radiative recombination predominant.

The detector of the secondary photons can be integrated with the InP based structure, e.g., as an epitaxially grown InGaAs photo-diode at one or more of the active volume surfaces or simply a properly attached InGaAs photo-diode. Alternatively, the detector of secondary emission is located outside the active semiconductor body and therefore means for enhancing the transfer of secondary light to the detector of secondary emission are contemplated. Several techniques for enhancing the emission of light from semiconductor to air have been perfected by the light-emitting diode community and are known to those skilled in the art, see for example, Vasily Zabelin et al, IEEE Journal of Quantum Electronics, Vol. 40, No. 12, December 2004, pp. 1675-1686.

The first type detector is simple for fabrication and is expected to be extremely fast. It does not need high voltages or low temperatures for operation. It is also important that, the inventive detector is suitable for semiconductor materials that have constituents with higher atomic number than either Si or Ge and therefore higher radiation energies can be registered. The preferred embodiment comprises InP, but other appropriately doped direct gap semiconductors can be used also, such as GaAs and HgCdTe. Although the device thickness is limited due to the effect of self-absorption, as discussed more thoroughly in the section below, entitled "Detailed description of the invention", it can be successfully used as a fast particle counter. Unlike the well known Geiger counter, whose response time is in the range of only milliseconds, the estimated response time of the inventive detector is in the range of nanoseconds, thereby providing detection of 6 orders of magnitude higher ionizing radiation intensity.

The second type of the radiation detector, according to the present invention, relies on a more complicated design of the semiconductor structure, which allows one to essentially eliminate self-absorption. The preferred embodiment is InP/InGaAs lattice-matched heterostructure, but other high-quality heterostructures can also be used, including among others InP/InGaP, GaAs/AlGaAs, and $Hg_xCd_{1-x}Te/Hg_yCd_{1-y}Te$ system.

The principle of operation of the invented second type detector is as follows: a multi-layer heterostructure is used in which a thick, approximately 1 or 2 μm, high energy bandgap material (exemplarily, InP) is periodically alternated by a thin (approximately 10 nm) low energy gap material (exemplarily, InGaAs lattice matched to InP). Requirements to the relative thicknesses of these two layers in each period are not stringent.

After the electron-hole generation under high-energy radiation, both electrons and holes quickly diffuse from the InP layers into the InGaAs wells and recombine there by emitting secondary photons of light with the energy lower than the energy gap of InP. This largely removes the effect of self-absorption in InP layers. However, the InGaAs wells, whose combined thickness is about 0.5% of the total detector thickness, still remain absorptive. To further minimize the self-absorption of secondary light, the InGaAs wells are heavily doped with donors. As discussed above, heavy doping reduces the effect of self-absorption in the wells due to Moss-Burstein shift as well as shortens the radiative recombination time, thus making it dominant mechanism of recombination.

To make a radiation detector capable of registration of gamma radiation, one needs a relatively large active volume of about 1 cm$^3$. This poses a challenging task to the growth technique such as Metalorganic Vapor Phase Epitaxy (MOCVD), which is a relatively slow growth process. The challenge is entirely in the growth time that may span several days, but because of the superior material quality produced with MOCVD, this technique may still be advantageously used. The preferred method is the hydride vapor phase epitaxy, HVPE, which allows a growth rate of 100 μm per hour and even higher.

In the preferred embodiment we contemplate the growth of 300 μm-thick films that may be free standing, i.e. grown on a thin substrate that is subsequently removed. By making a stack of such films, one obtains the desired detector volume. Exemplarily, 33 heterostructure films are stacked up to make a 1 cm thick detector structure. To minimize the internal light reflections, an intermediate film comprising a transparent fluid, powder or epoxy having an index of refraction similar to InP is placed between the films. The intermediate film can be also a composite, prepared by introducing into the liquid, powder or epoxy fine grain high-index particles, as known to those skilled in the art. Recently, there has been a significant progress in engineering high-index fluids or pseudo-fluids that can be used as intermediate layer films in our context. Thus, Nobuyuki Kambe and co-workers reported at the 2001 MRS Conference in San Francisco highly homogeneous nanoparticle-polymer composite materials with high refractive index. Their article, available from the website of NanoGram Corporation, Fremont, Calif. (http://www.nanogram.com/information/papers.htm), and entitled "Refractive Index Engineering of Nano-Polymer Composites" reports, for example, a mixture of nano-size $TiO_2$ particles in PAA (poly acrylic acid) host having an index of refraction of 2.5.

The inventive heterostructure radiation detector is expected to have nearly 100% internal emission efficiency. Practically all loss of secondary light inside the heterostructure is eliminated. Another important feature of the inventive radiation detector is that the precise position in the heterostructure, where electron-hole pairs are created, does not significantly affect the shape and the amplitude of the output optical signal. Thus, the second type detector is expected to combine the best properties from both currently existing groups of scintillation and semiconductor solid-state radiation detectors.

As to the first type detector, while the absorption of secondary radiation is substantially suppressed, it remains tangible and limits the total thickness of the slab comprising the active zone of interaction. Nevertheless, the first type detector has the advantage of low cost. Compared to know scintillators it has the advantage in that it does not need high voltages for operation, and has a short secondary photo-emission time of about one nanosecond. It should be noted that the first type detector does not need low temperatures for its operation, however since the transparency of Moss-Burstein shifted semiconductor exponentially increases with decreasing temperature, at cryogenic temperatures the material is extremely transparent and therefore can be made as thick as the second type detector.

BRIEF DESCRIPTION OF THE DRAWINGS

The invention is described using the following drawings.

Part (a) shows the spectra of InP at different doping levels, after H. Burkhard, H. W. Dinges, and E. Kuphal, J. Appl. Phys. 53, No 1 (1982) pp. 655-662.
1. p-type sample, $p_o=1.1 \cdot 10^{18}$ cm$^{-3}$
3. n-type sample, $n_o=1.9 \cdot 10^{18}$ cm$^{-3}$
2. n-type sample, $n_o=7.4 \cdot 10^{16}$ cm$^{-3}$
4. n-type sample, $n_o=7 \cdot 10^{18}$ cm$^{-3}$ Part (b) shows the absorption spectra of InP at two different doping levels in the linear scale and also shows superimposed the emission curve, corresponding to a low-doped material. At high doping the emission curve shifts to lower energies, due to the well-known bandgap narrowing effect.

DETAILED DESCRIPTION OF THE INVENTION

The main feature of both types of the inventive detectors is the novel use of the semiconductor material as a scintillator with a high efficiency of light emission and reduced light absorption. It is also desirable to choose the semiconductor material with a high atomic number and fast rate of radiative recombination. The light emitted by the semiconductor in response to absorption of high-energy radiation is then registered by a photo-detector that converts the secondary photoemission into electrical signals, which then enter a system for signal analysis.

Figure 2:
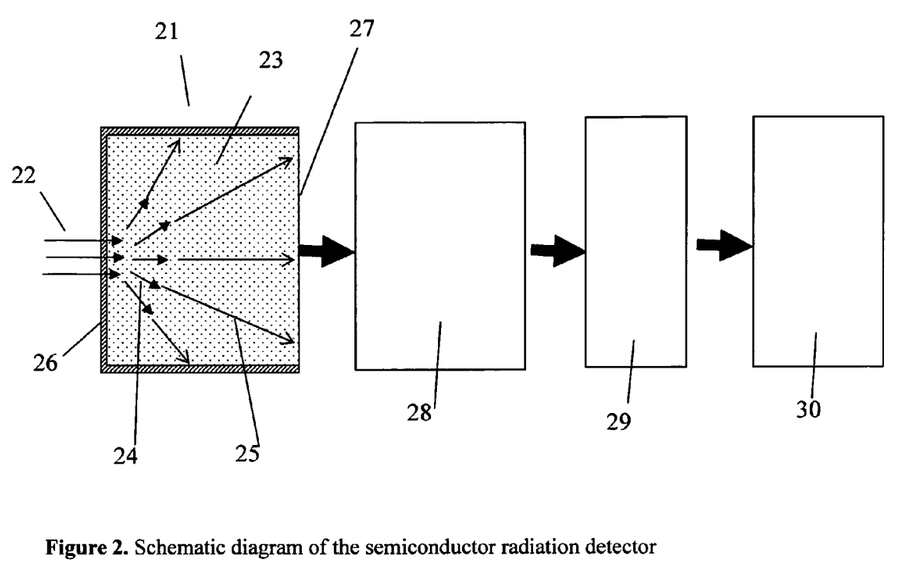
FIG. 2. Conceptual view of the semiconductor scintillation high-energy radiation detector showing schematically the essential components of the apparatus.

The general conceptual view of the semiconductor scintillation detector is shown in FIG. 2. The scintillator 21 is shown as a box wherein the ionizing radiation 22 penetrates into the active zone 23 and creates electrons and holes 24. They recombine and produce secondary photo-emission 25 which propagates across the scintillator volume. The light propagation length, and therefore the active zone volume, is different in the two types of detectors under consideration.

To prevent photon losses at the boundaries of the active zone, the scintillator 21 is coated with a thin light reflecting film 26. Only one side 27 of the detector, designated to the signal output, remains uncoated. A thin film of Al is the preferred material for this coating: 50 nm-thick Al film is a good optical reflector, while the absorption of high-energy radiation 22 in this layer is insignificant. For low energy X-rays or other types of ionizing radiation, the film can be removed at a relatively narrow entrance window for the ionizing radiation (not shown).

Box 29 in FIG. 2 designates a photo-detector that converts secondary photoemission into an electrical signal. Depending on the wavelength, different photo-detectors can be used. When the photon energies of secondary photoemission are above 1.5 eV, a photo-multiplier is the device of choice. For the photon energies in InGaAs photoemission (~0.8 eV), photodetectors of choice are implemented in a narrow gap semiconductor material, such as InGaAs, in combination with a signal amplifier. Finally, the electrical pulses from the photo-detector 29 enter the system 30 for signal analysis and recording.

If the detector of choice is physically separate from the active zone 23, several methods known in the art can be used to maximize the extraction of secondary photoemission from the semiconductor volume 23 and photon delivery to the photo-detector. The problem with extraction originates from the effect of total internal light reflection at the interface of two materials having different indices of refraction. The means of light extraction, indicated in FIG. 2 as box 28, include (but are not limited to) such methods as making a scintillator output surface in the shape of a hemisphere (known as the Weierstrass sphere) and/or making the output surface textured. Recent results in LED technology show that the extraction efficiency as high as ~60% can be achieved, as described, for example, in the article by R. Windish, C. Rooman, B. Dutta, A. Knobloch, G. Borghs, G. H. Döhler, and P. Heremans, "Light-Extraction Mechanisms in High-Efficiency Surface-Textured Light-Emitting Diodes", IEEE JOURNAL ON SELECTED TOPICS IN QUANTUM ELECTRONICS, VOL. 8, NO. 2, MARCH/APRIL 2002, and references therein.

Figure 3:
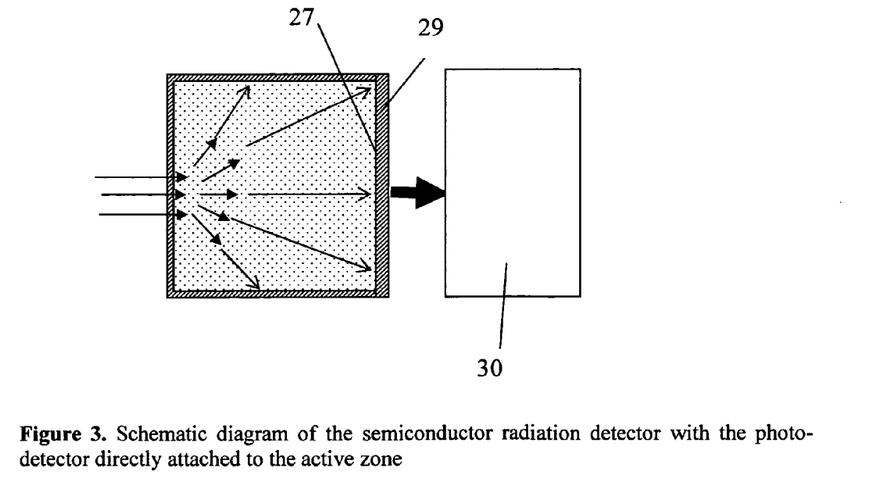
FIG. 3. Semiconductor scintillation high-energy radiation detector with the photo-detector directly attached to the active zone FIG. 4. Energy band diagram of the semiconductor material in the active interaction zone of the first type detector.

FIG. 3 illustrates another detector embodiment. In this case, the photo-detector 29 is attached directly to the output surface 27. The photo-detector is made from the material having similar index of refraction as the active zone material. For InP as an active zone material, InGaAs photo-detector is a preferred embodiment. The integrated arrangement of the active zone with the detector of secondary photoemission implemented in materials of similar refractive index largely eliminates the unwelcome internal reflections. Another preferred embodiment involves a silicon avalanche photodiode attached to the output surface. Since the refractive index of Si is higher than that of InP, there will be virtually no internal reflection at the Si/InP interface. However, there may be a practical problem associated with the fact that the two surfaces, that of Si detector and the output surface of the scintillator may be not entirely flat, resulting in air gaps between the two and unwelcome reflections. This type of reflection will be minimized by using an intermediate film comprising a transparent fluid, powder or epoxy having a high index of refraction. For example, one can advantageously employ various homogeneous nanoparticle-polymer composite materials with high refractive index, similar to those disclosed by Kambe, as cited above.

A particularly attractive method for said integration is accomplished by an epitaxial growth of the photo-detector structure on the output surface of the active zone. Integrated photo-detector designs are applicable to both types of inventive radiation detector. In order to make the response of such a detector faster, it can be pixellated and independently contacted, thus minimizing the capacitance of each pixel, as is well-known to those skilled in the art.

Below, the basic features of both types of detectors are analyzed with the purpose to understand their limitations and facilitate the optimum choice of active zone geometry.

Semiconductor Slab as the Active Zone (Type One Detector).

Figure 4:
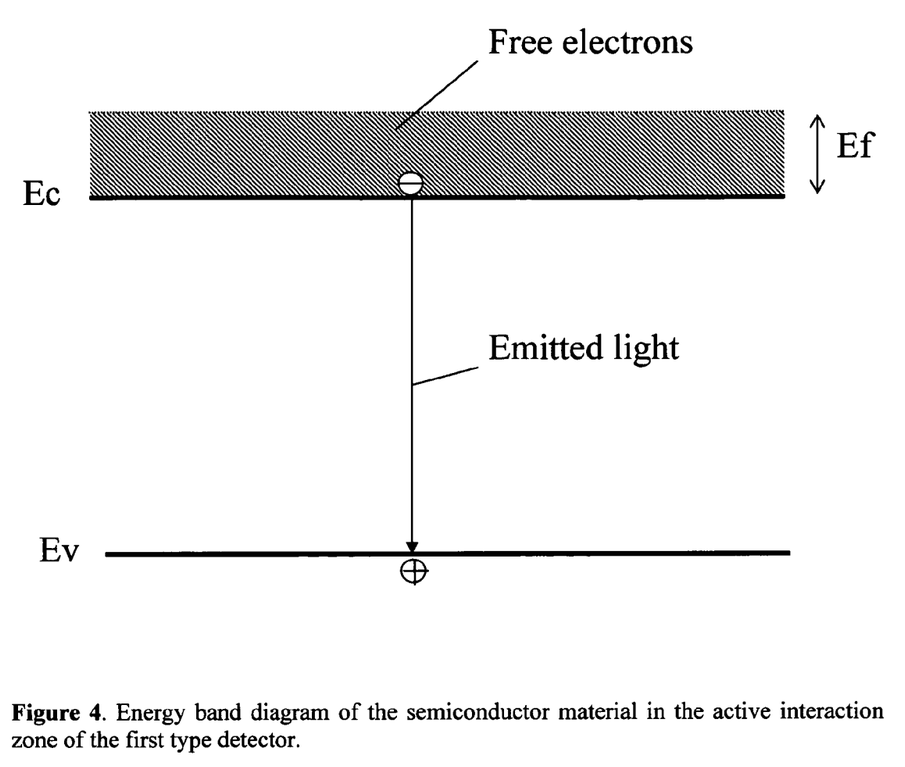

As discussed above, the first type detector employs as the active zone a slab of semiconductor material with a direct-gap energy band structure. The material is heavily doped n-type in order to both minimize the effect of self-absorption of secondary photoemission and enhance the rate of radiative recombination. FIG. 4 illustrates the energy-band diagram of the first type detector. We take Inp as an example, with a realistic donor concentration of $10^{19}$ cm$^{-3}$. In this case, the electron Fermi level Ef counted from the bottom of the conduction band is about Ef ~0.15 eV. As is well known to those skilled in the art, the reduction of the inter-band absorption coefficient due to the lowering of the density of unoccupied states at the conduction band edge is exponential with the ratio Ef/kT where k is the Boltzmann constant:

$$\alpha = \alpha_0 \cdot \exp(-Ef/kT) = \alpha_0 \cdot \exp(-0.15/0.027) \sim 10^4 \text{ cm}^{-1}/300 \sim 30 \text{ cm}^{-1}$$

where $\alpha_0$ is the inter-band absorption coefficient at photon energies near the bandgap of the undoped material, taken approximately as $\alpha_0 = 10^4$ cm$^{-1}$ and $\alpha$ is the effective absorption coefficient at the same photon energies, when the Moss-Burstein shift is taken into account. This result is consistent with the experimental observations of FIG. 1. The expected effective self-absorption coefficient for secondary photons emitted by InP at the donor density of $10^{19}$ cm$^{-3}$ is approximately $\alpha = 25 \sim 30$ cm$^{-1}$.

The radiation recombination time $\tau$ depends on the doping level. If donors are chosen for doping with the concentration $N_d$, the electron concentration no is approximately equal to $N_d$ and the rate R of radiative recombination is described by R=p/$\tau$ where p is the concentration of generated holes and $\tau = (BN_d)^{-1}$, where B~$10^{-1}$ cm$^3$/s is the radiation recombination coefficient, see, e.g., R. H. Saul et al., "LED device design" in "Semiconductors and Semimetals", Vol. 22, p. 193, 1985. For the doping $N_d = 10^{19}$ cm$^{-3}$, one obtains $\tau = 10^{-9}$s. This radiative recombination rate is about two orders of magnitude faster than the rate of all non-radiative processes combined and radiative recombination becomes the dominating recombination process. A good estimate is that 99% of recombination proceeds radiatively and only a tiny 1% fraction, $\xi = 0.01$, recombines nonradiatively. Nevertheless, the non-radiative processes do matter as they ultimately limit the extent of the active zone.

Indeed, the process of self-absorption by itself does not imply loss of photons and attenuation of secondary photoemission. Absorption of secondary photons creates new electrons and holes and is followed by their recombination and hence re-generation of the secondary emission. The direction of propagation of the re-generated photons is not correlated with the direction of initial absorbed photon. This means that when the thickness L of the semiconductor slab constituting the active zone (region 23 in FIG. 2) is thicker than the characteristic mean free path $\alpha^{-1}$ between the individual acts of self-absorption, then the propagation of secondary emission is a diffusive process. In such a process the distance covered is typically proportional to the square root of the number of steps $N_{step}$. We can therefore estimate this number as follows: $N_{step} \sim (\alpha L)_2$.

For many applications of the inventive detectors it is important to keep $\xi N_{step} << 1$ and the mentioned limitation of the extent of the active zone arises from this requirement. Indeed, simple analysis shows that the fraction of particles remaining in transport after $N_{step}$ collisions with a fraction $\xi$ of particles lost at each collision is described by the exponential factor $e^{-\xi N step}$. Consider a slab which is ten times thicker than the mean free path, $\alpha L \sim 10$. This means the expected number of diffusion steps is $N_{step} \sim 100$. Bearing in mind that a fraction of photons $\xi = 0.01$ is lost at each step to nonradiative processes, we find that after $N_{step}$ only a fraction $e^{-\xi Nstep} \approx 37\%$ of photons remain in secondary photo-emission. For some applications this may be acceptable, but we can anticipate significant analysis problems arising from the fact that the yield of secondary photons to the output surface (surface 27 in FIG. 2) becomes dependent on the position in the slab, where the first carriers are generated by ionizing radiation.

In the preferred embodiment, therefore, the slab thickness L is chosen as to obtain the value of $\xi N_{step}$ to be much less than unity, exemplarily less than 0.1. In this case, the internal collection efficiency $e^{-\xi Nstep} > 0.9$, and the yield becomes approximately independent of the initial ionization position. The number of diffusion steps is therefore taken to not exceed $N_{step} \sim 10$. Our estimation above, gave $\alpha = 30$ cm$^{-1}$ for secondary photons emitted by InP doped to $N_d = 10^{19}$ cm$^{-3}$. At room temperature, this estimate is somewhat optimistic, and we find the limitation $N_{step} \sim 10$ corresponds to L=1 mm. Assuming, more conservatively, $\alpha = 100$ cm$^{-1}$, we find L~300 μm.

This choice also minimizes the response time of the detector. The response comprises two distinct contributions. One contribution, associated with the propagation of light, is rather negligible, because the speed of light c in the semiconductor material is very high. In the diffusive propagation, the diffusion coefficient of light $D \sim c\alpha^{-1} > 10^8$ cm$^2$/s and the corresponding delay $L^2/D$ is less than 10 ns even for a centimeter-thick slab. This estimate is based on the well-known relation, which expresses the diffusion coefficient in terms of the product of particle (in our case, photon) mean velocity and mean free path. The other contribution to the delay is associated with the accumulated recombination times at the absorption-reemission events, which total τ $N_{step}$=10 ns.

Optimization of the slab thickness from the standpoint of making the yield of secondary photons to the output surface substantially independent on the position in the slab, where the first carriers are generated by ionizing radiation, may result in a thinner slab than that desired from the standpoint of efficient absorption of incident ionizing radiation. In those cases, when the direction of incident radiation is known, e.g. when the source of ionizing radiation is seen at a small body angle from the position of the detector slab, it is advantageous to orient the detector in such a way that the incident radiation is parallel to the plane of the slab. In this case, the linear dimension of the slab in the direction of incident radiation can be made substantially larger than the slab thickness, while the yield of secondary photons to the output surface remains substantially independent on the position in the slab, where the first carriers are generated by ionizing radiation.

We stress that the active zone volume can be dramatically increased by lowering the detector temperature. For a given amount of doping, the suppression of self-absorption of secondary emission due to the Moss-Burstein shift is an exponentially increasing function of the inverse absolute temperature. For example, if the temperature is decreased to that of the dry ice (-79° C.), i.e., when the absolute temperature is T=194° K, while keeping the same doping level corresponding to Ef~0.15 eV, the effective absorption coefficient α decreases by a factor of 24 compared to that at room temperature (T=300° K). The dry ice value of α≈1 cm$^{-1}$ allows extending the active zone of detector to nearly 3 cm with the same 90% value of the internal collection efficiency. The efficiency will be further improved by operating the first type detector in cryogenic environment, at temperatures of liquid nitrogen or helium. The design of a cryogenic detector can, therefore, afford a substantially larger active volume.

Semiconductor Heterostructure Detector (Second Type Detector)

As discussed above, the room-temperature efficiency of the first type detector is limited by the mean free path $α^{-1}$ between the individual acts of self-absorption of secondary photoemission. It is therefore important to consider ways of enhancing said mean free path. This is precisely what is accomplished by the second type detector according to present invention.

Figure 5:
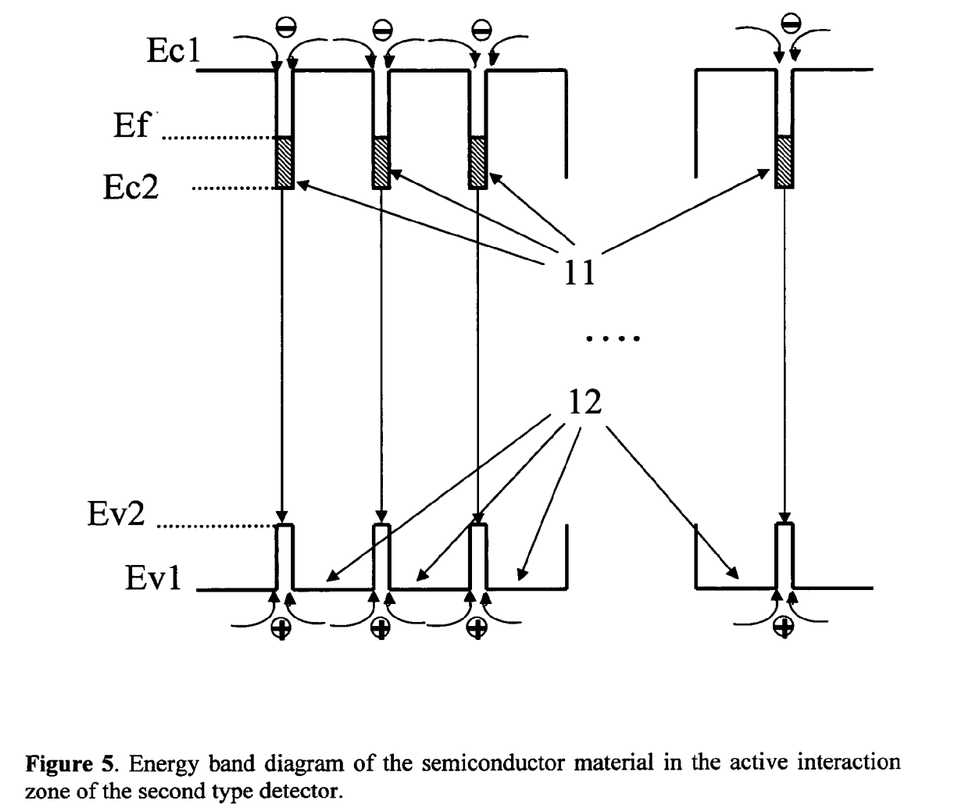
FIG. 5. Energy band diagram of the semiconductor material in the active interaction zone of the second type detector.

FIG. 5 shows the energy band diagram of the heterostructure material of the second type detector. It comprises two alternating materials, the first and the second, having different energy gaps, $Eg_1=Ec_1-Ev_1$ and $Eg_2=Ec_2-Ev_2$, respectively. Without loss of generality we assume the second material to have the lower bandgap, $Eg_1>Eg_2$. We further assume the second material may be doped, while the first material is largely undoped. We shall refer to carriers of type produced by the doping in second material as the majority carriers, and the complementary type of carriers as the minority carriers. This nomenclature will be applied also to carriers in the undoped first material.

An essential part of the inventive structure is that the total volume occupied by the second material in the active zone is small compared to that occupied by the first material, exemplarily less than 10%. Another essential part is the geometry of the heterostructure, which is subject to the requirement that every point in the first material is within the diffusion length from the nearest region of second material.

The diffusion length here is a characteristic of minority carriers and describes the typical distance they cover in the diffusion process over their lifetime. Said lifetime is determined by the recombination processes in the undoped first material and depends on the purity and the quality of this material. The said geometry requirement guarantees that even though most of the slab volume is filled with the first wide-gap material, the radiative recombination occurs predominantly in the second narrower-gap material. The first material is therefore substantially transparent to secondary photoemission photons.

The most general contemplated structure does not have to be layered. It may comprise droplets or impregnations of second material embedded in the matrix composed of the first material.

The preferred embodiment is described in terms of an epitaxially grown layered heterostructure, assuming exemplarily the first material to be InP and the second material InGaAs lattice matched to InP.

Layer thicknesses are periodically alternated during the material growth (the growth direction in FIG. 5 is depicted as the horizontal direction). Strict periodicity is not important, the word "periodic" is used to describe an approximate repeated pattern. The narrow layers 11 of material with the lower energy gap Eg2, are chosen to be a direct semiconductor, while layers 12 of the higher energy gap material are significantly thicker and can be made of either direct or indirect semiconductor. An important requirement to these layers is their compatibility for the heterostructure growth. This implies that they are lattice-matched and have similar crystallographic structure. Such a requirement may be relaxed for nonlayered structures.

Thicknesses of layers 11 and 12 may vary, but the preferred values are 10 nm for the lower energy gap layers 11 and 2 μm for the higher energy gap layers 12. This implies that the combined volume of layers 11 is a small fraction φ=0.5% of the active zone volume. The fraction φ can be further decreased, to the advantage of device performance, by making layers 12 still thicker, but this may put stringent demands on the purity of these layers and their quality, which determines the diffusion length.

The electrons and holes created by ionizing radiation in layers 12 diffuse to the low energy gap layers 11, which energetically represent potential wells for both electrons and holes. Upon reaching the well, the carriers thermalize there within a time of a few picoseconds. The diffusion time $t_{tr}$ of carrier traveling toward the wells is determined by the well-known relation:

$$t_{tr}=L^2/D,$$

where L is the distance to travel and D is the carrier diffusion coefficient. Typical values of D are D=200 cm$^2$/s for electrons and 10 cm$^2$/s for holes. For the exemplary layers 12 of thickness 2 μm, the distance to travel to the nearest well is ~1 μm, giving $t_{tr}$=5.10$^{-11}$ s for electrons and $t_{tr}$=10$^{-9}$ s for holes.

The disparity of the electron and hole diffusion times offers two different strategies for doping layers 11. From the standpoint of obtaining faster response it makes sense to dope the wells with acceptors, thus making holes the majority carriers. The response time will be controlled by the minority carrier diffusion time which is faster for electrons. On the other hand, owing to the lower effective mass for electrons, doping the wells with donors produces larger Moss-Burstein shift in the wells and makes the slab more transparent.

Once electrons and holes are collected in the wells 11, they will recombine emitting secondary photons of energy close to $Eg_2$. Since $Eg_1 > Eg_2$ there is virtually no absorption of these photons in the high energy gap material 12, and this is the key factor for obtaining improved optical efficiency.

The remaining absorption of secondary photoemission light in the heterostructure comes essentially from self-absorption in the wells. This effect of self-absorption can be further suppressed by increasing the carrier density in the well, as discussed above. Under the degenerate conditions (see FIG. 4), the Fermi energy Ef of free carriers shifts the edge of the interband absorption to higher energies (Moss-Burstein shift) and suppresses the absorption of secondary photoemission photons. As discussed above, doping with donors is more efficient in this regard, because of the lower density of states in the conduction band of typical III-V materials compared to valence band density of states. Therefore, at the same doping concentration, the energy Ef for electrons is higher.

We present estimates of this effect for the exemplary InP/InGaAs heterostructure where 2 μm-thick layers of undoped InP are periodically alternated by 10 nm-thick InGaAs wells. For the electron density in the well of $10^{19}$ cm$^{-3}$, the Fermi energy Ef≈0.15 eV yielding the absorption coefficient of approximately $\alpha = 30$ cm$^{-1}$ for the well material and a still 200 times smaller value for the effective coefficient, $\alpha_{eff} = \phi\alpha \approx 0.015$ cm$^{-1}$ corresponding to the average absorption coefficient in the active zone. This means that the propagation of secondary photons will be ballistic as opposed to diffusive even for a several cm thick active zone. Nonradiative processes will play no role in this case and the internal collection efficiency will approach 100%. The above estimate treats 10 nm wells as classical regions, ignoring quantum confinement effects, which when present will further improve the transparency due to an additional suppression of the density of states in the well.

Beside the lattice-matched InP/InGaAs heterostructure illustrated in the above example, other heterostructures can also be used, as dictated by the ease of the growth and cost considerations. An important design consideration is the bandgap difference between the undoped wide-gap layers and doped narrow-gap wells, which must be sufficiently large to prevent thermal population of wide-gap layers and ensure that the wide-gap material is substantially transparent to photons generated in the narrow-gap wells. Said design considerations are well understood by those skilled in the art and are affected by the planned operating temperature of the detectors, as well as such parameters as the Fermi energy, dimensional quantization in the wells and the spectral width of the luminescence line produced by carrier recombination in the wells, which is influenced by both homogeneous and inhomogeneous broadening.

While there has been shown, described, and pointed out fundamental novel features of the present invention as applied to preferred embodiments thereof, it will be understood that various omissions and substitutions and changes in the devices described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A detector of high-energy radiation comprising a slab of direct-gap semiconductor material, doped with impurities of one type, wherein secondary interband photons are emitted in response to high-energy radiation, and further comprising means for detecting the flux of said secondary interband photons and converting it to electrical signal that quantifies the intensity of said flux.

2. A detector of high-energy radiation as in claim 1, where said dopant impurities of one type are shallow donors, said doping being so heavy that the Fermi energy counted from the bottom of the semiconductor conduction band is larger than the operating temperature of the detector expressed in energy units, so that re-absorption of secondary photons inside said direct-gap semiconductor is substantially suppressed.

3. A detector of high-energy radiation as in claim 1, where said doped direct-gap semiconductor is InP.

4. The detector of claim 1, wherein the surface of said slab of semiconductor material is coated with an optically reflective film for secondary photons, leaving uncoated an output surface.

5. A detector of high-energy radiation as in claim 4, where said means for detecting the flux of secondary photons is a photonic detector integrated on said output surface of the semiconductor slab.

6. A detector of high-energy radiation as in claim 4, where said output surface of the semiconductor slab is textured so as to enhance the emission of said secondary photons into the space outside said semiconductor slab.

7. A detector of high-energy radiation as in claim 4, where said means for detecting the flux of secondary photons is a photonic detector located in the space outside said slab.

8. The detector of high energy radiation of claim 5 wherein said photonic detector, is epitaxially grown on said output surface of said semiconductor slab.

9. The detector of high energy radiation of claim 8, wherein said photonic detector is pixellated.

10. A detector of high-energy radiation as in claim 7, where said photonic detector is a photomultiplier.

11. A detector of high-energy radiation as in claim 1, where the thickness of said slab is substantially larger than the absorption length of said secondary photons so that said secondary photons travel diffusively and experience multiple absorption and re-emission events.

12. A detector of high-energy radiation as in claim 11, where the thickness of said slab is chosen sufficiently thin that most of said diffusively-traveling photons reach said second surface of the slab.

13. A scintillation detector of high-energy radiation comprising a semiconductor slab that is composed of a first region and further comprises a multiplicity of regions of second semiconductor material, CHARACTERIZED IN THAT:

(a) the total volume occupied by said regions of second semiconductor material is less than 10% of the volume of said slab;

(b) said regions of second semiconductor material are composed of a direct-gap semiconductor material whose bandgap is smaller than the bandgap of the first region so that said first region is substantially transparent to photons generated by carrier recombination in said regions of second semiconductor material;

(b) each of said regions of second semiconductor material is separated from another such region by a distance that is substantially shorter than the diffusion length of carriers in the first region.

14. A detector of high-energy radiation as in claim 13, where said regions of first and second semiconductor material are alternating thin layers.

15. A detector of high-energy radiation as in claim 14, where said thin layers are composed of InP for the first region and InGaAsP lattice matched to InP for the second region.

16. A detector of high-energy radiation as in claim 13, where said regions of second semiconductor material are heavily doped with shallow impurities.

17. A detector of high-energy radiation as in claim 16, where said shallow impurities are donors.

18. A detector of high-energy radiation as in claim 14, where said thin layers are composed of AlGaAs alloy for the first region and GaAs for the second region.

19. A detector of high-energy radiation as in claim 13, where said semiconductor slab is obtained by stacking multiple epitaxially grown heterostructure films.

20. A detector of high-energy radiation as in claim 19, where said stack of multiple epitaxially grown heterostructure films further comprises intermediate films of high refractive index, made as fluid, powder or epoxy, transparent for secondary photons and interspersed between every two films in said stack.

21. A detector of high-energy radiation as in claim 20, where said intermediate films contain fine grain particles of high-index material transparent in the spectral region of light radiation of said detector of high-energy radiation.

* * * * *